United States Patent [19]
Maki et al.

[11] Patent Number: 5,626,518
[45] Date of Patent: May 6, 1997

[54] TORQUE ABSORBING DEVICE

[75] Inventors: Naoyuki Maki, Hazu-gun; Yukihisa Takashi, Chita-gun, both of Japan

[73] Assignee: Aisin Seiki Kabushiki Kaisha, Kariya, Japan

[21] Appl. No.: 508,557

[22] Filed: Jul. 28, 1995

[30] Foreign Application Priority Data

Jul. 12, 1994 [JP] Japan .................................. 6-178255
Jul. 29, 1994 [JP] Japan .................................. 6-178256

[51] Int. Cl.$^6$ ...................................................... F16D 3/12
[52] U.S. Cl. ............................. 464/64; 192/205; 464/68
[58] Field of Search ........................... 464/64, 68, 66; 192/205, 212, 213.3, 213.31; 74/574

[56] References Cited

U.S. PATENT DOCUMENTS

| | | | |
|---|---|---|---|
| 4,709,796 | 12/1987 | Ueohara | 192/205 |
| 4,747,801 | 5/1988 | Chasseguet et al. | 464/66 |
| 4,950,205 | 8/1990 | Umeyama | 464/68 |
| 4,959,039 | 9/1990 | Naudin | 464/66 |
| 5,032,107 | 7/1991 | Umeyama et al. | 74/574 X |
| 5,092,820 | 3/1992 | Naudin et al. | 464/68 |

FOREIGN PATENT DOCUMENTS

| | | |
|---|---|---|
| 2620503 | 3/1989 | France . |
| 2624236 | 6/1989 | France . |
| 2652399 | 3/1991 | France . |
| 3314908 | 11/1983 | Germany . |
| 58-187623 | 11/1983 | Japan . |
| 59-26625 | 2/1984 | Japan . |
| 59-166030 | 11/1984 | Japan . |
| 2254907 | 10/1992 | United Kingdom . |

*Primary Examiner*—Daniel P. Stodola
*Assistant Examiner*—Eileen A. Dunn
*Attorney, Agent, or Firm*—Burns, Doane, Swecker & Mathis, LLP

[57] ABSTRACT

A torque absorbing device includes a hub member having a flange portion, plate members disposed around a hub portion of the hub member so as to be positioned opposite the flange portion in the axial direction, a plurality of torsion members elastically interconnecting the hub member and the plate members in the circumferential direction of the disc, and a plurality of seat members each of which is disposed among each of the torsion members, the plate members and the hub member. Each seat member has one side face portion contacting the circumferential end surface of each of the torsion members and the other side face portion contacting the plate members and the flange portion of the hub member. The other face portion is provided with a projected holding portion held on the flange portion of the hub member so as not to be able to move relative to the hub member and a guide portion nipping the flange portion of the hub member in the axial direction of the disc.

17 Claims, 8 Drawing Sheets

5,626,518

TORQUE ABSORBING DEVICE

FIELD OF THE INVENTION

The present invention relates to a torque absorbing device, and more particularly to a torque variation absorbing device which transmits input torque from a plate to a hub member through a plurality of torsion members which absorb the input torque.

BACKGROUND OF THE INVENTION

A conventional torque absorbing device is disclosed in, for example, Japanese Patent Application Laid-Open Publication Nos. 58 (1983)-187623, and 59 (1984)-26625, and Japanese Utility-Model Application Laid-Open Publication No. 59 (1984)-166030. This torque absorbing device includes a hub member having a flange portion and plate members which are disposed around a hub portion of the hub member so as to be opposite to the flange portion. Each of the plate members and the flange portion of the hub member have a plurality of window portions each of which extends in the circumferential direction of the disc. The plate members are disposed so that their window portions overlap the window portions of the flange portion of the hub member. The hub member and the plate members are elastically connected to each other in the circumferential direction of the disc through a plurality of torsion members which are each disposed in the overlapped window portions so that an input torque is transmitted from the plate members to the hub member through the torsion members while being absorbed by a flexible contraction of each torsion member. In this conventional torque absorbing device, a seat member is disposed among an axial end surface of each of the torsion members, circumferential end surfaces of the window portions of the plate members, and the flange portion of the hub member. A supporting portion having a flange shape is formed on an edge portion of each window portion of the plate members and the seat members are prevented from relative movement with regard to the plate members by the supporting portions and the circumferential surfaces and the circumferential end surfaces of the window portions.

In the above known torque absorbing device, however, the seat members are not prevented from relative movement with respect to the hub member. Therefore, in the case where, for example, the torsion members are contracted by the torque through the plate members, the seat members located in the input side keep contacting the circumferential end surfaces of the window portions of the plate members in order to prevent movement. On the other hand, the seat members located in the output side are separated from the circumferential end surfaces of the window portions of the plate members. As a result, the seat members located in the output side can be moved with the torsion members in the diametrical and axial direction of the device by centrifugal force and the like. Accordingly, the seat members located in this movable side are pressed to the plate members and this movement of the seat members may cause wear.

A need exists, therefore, for a torque absorbing device which overcomes the above drawback.

It would be desirable to provide a torque absorbing device in which the wear of the seat member caused by the plate members is prevented.

SUMMARY OF INVENTION

To address at least these needs, the present invention provides according to one aspect a torque absorbing device which includes a hub member having a flange portion, plate members disposed around a hub portion of the hub member so as to be opposite to the flange portion in the axial direction, a plurality of torsion members elastically connected between the hub member and the plate members in the circumferential direction of the disc and a plurality of seat members each of which is disposed among each of the torsion members, the plate members and the hub member. Each of the seat members has one side face portion in contact with the circumferential end surface of each of the torsion members and the other side face portion in contact with the plate members and the flange portion of the hub member. The other face portion is provided with a projected holding portion held on the flange portion of the hub member so as not to be able to move relative to the hub member and a guide portion nipping the flange portion of the hub member in the axial direction of the disc.

According to another aspect of the invention, a torque absorbing device includes a hub member having a radially extending flange portion and a hub portion, plate members disposed around the hub portion on opposite sides of the flange portion, a plurality of torsion members elastically interconnecting the hub member and the plate members in the circumferential direction to absorb torque created during relative rotational movement between the hub member and the plate members, and a seat member positioned at each end of each respective torsion member. Each seat member has a first side face contacting the end of the respective torsion member and an oppositely facing second side face, with the second side face of each seat member having a projecting holding portion which is received in recesses provided in the flange portion and the plate members to hold the seat member on the hub member and the plate members in circumferential and diametrical directions.

In accordance with another aspect of the invention, a torque absorbing device includes a hub member having a radially extending flange portion and a hub portion, plate members disposed around the hub portion on opposite sides of the flange portion, a plurality of torsion members elastically interconnecting the hub member and the plate members in a circumferential direction to absorb torque created during relative rotational movement between the plate members and the hub member, and a seat member positioned at each end of each respective torsion member. Each seat member possesses a first side face contacting the end of the respective torsion member and an oppositely facing second side face. The second side face of each seat member has a pair of projecting guide portions between which is pinched the flange portion of the hub member.

BRIEF DESCRIPTION OF THE DRAWING FIGURES

Additional features and advantageous attributes associated with the present invention will become more apparent from the following detailed description of preferred embodiments considered with reference to the accompanying drawing figures in which like elements bear like reference numerals and wherein.

DETAILED DESCRIPTION OF THE PREFERRED EMBODIMENTS

Figure 1:
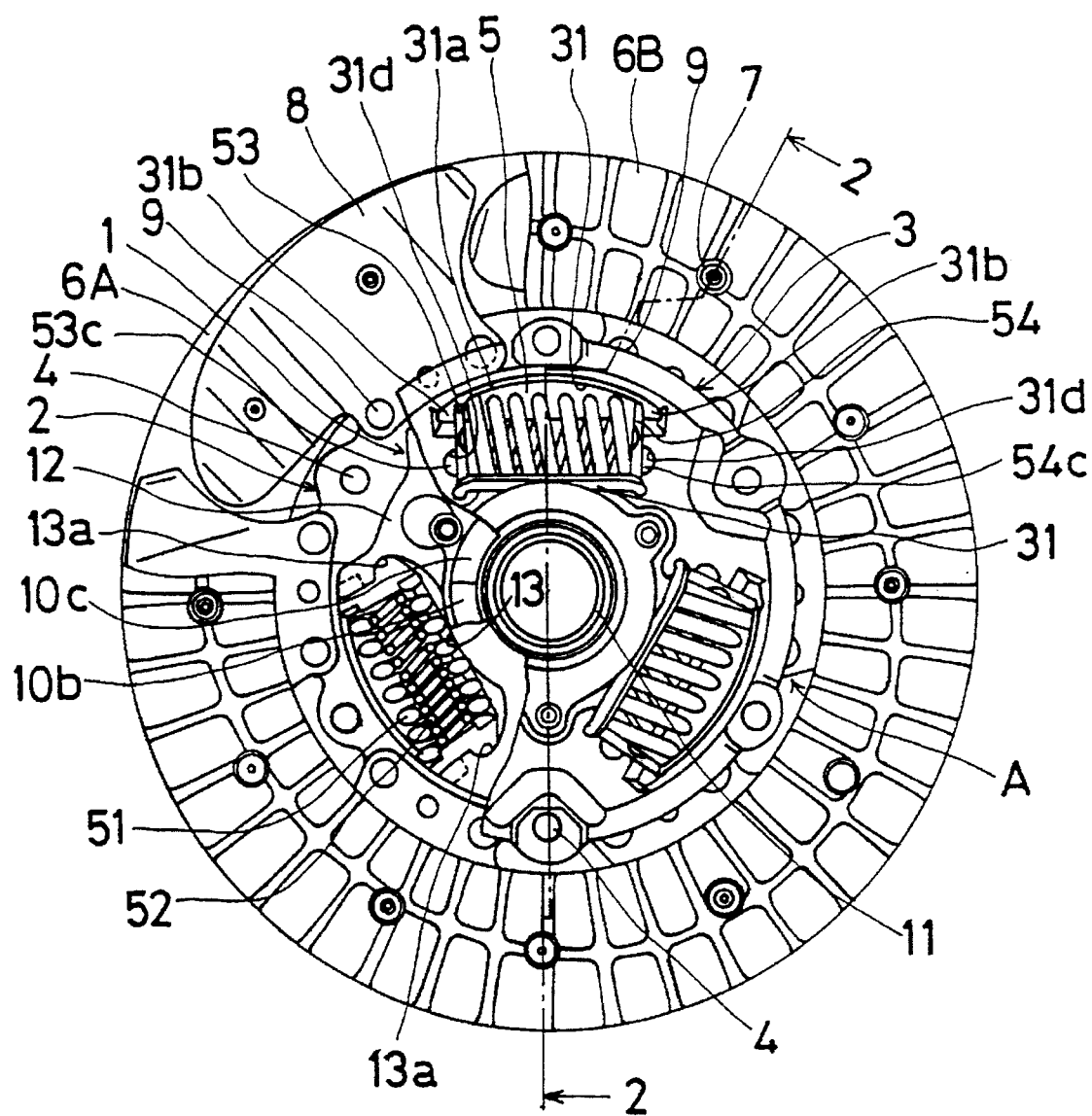
FIG. 1 is a plan view of a first embodiment of a clutch disc to which is applied a torque absorbing device in accordance with the present invention.
Figure 2:
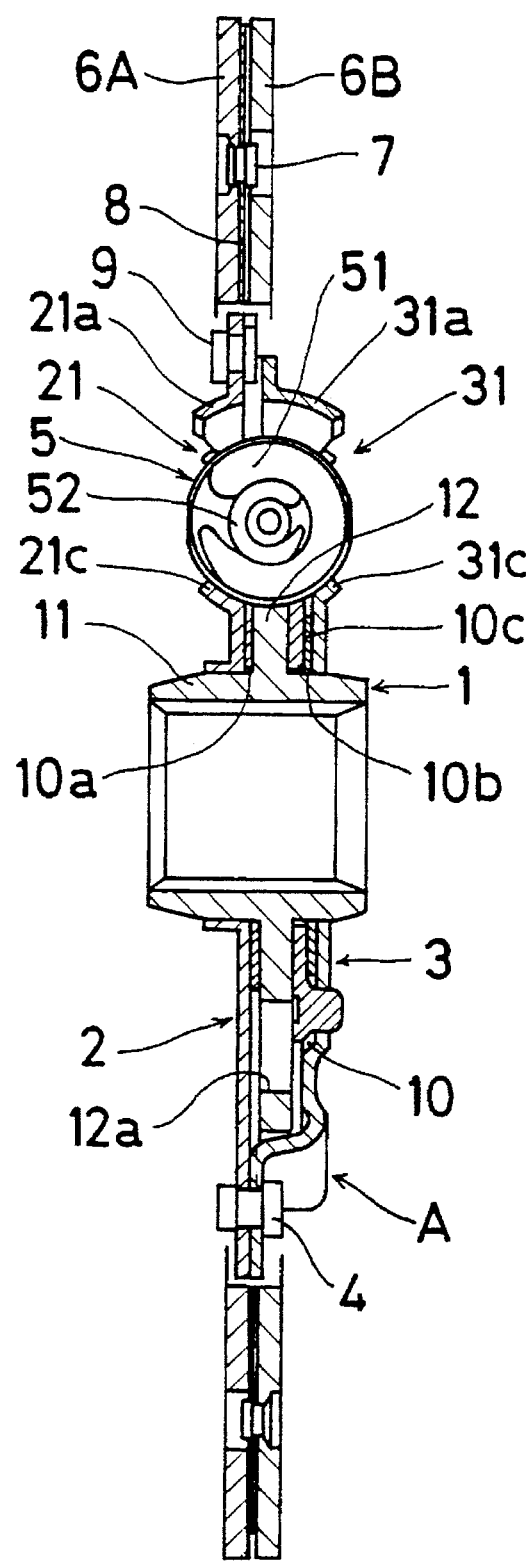
FIG. 2 is a cross sectional view taken along the line 2—2 of FIG. 1.

Referring to FIG. 1 and FIG. 2, a torque absorbing device A of the present invention is applied to a clutch disc of a frictional clutch which is disposed between the engine (not shown) and the transmission (not shown) of an automobile. A plurality of plate springs 8 having waves are fixed to an outer circumferential portion of a disc plate 2 at regular intervals in the circumferential direction by rivets 9. A pair of circular facings (frictional members) 6A, 6B which are held between a flywheel (not shown) of the engine and a pressure plate (not shown) by a spring force are fixed as an input member to side faces of the plate springs 8 by rivets 7 to thereby sandwich the plate springs 8 therebetween. An input shaft (not shown) of the transmission is inserted as an output member into a hole of a hub portion 11 of a hub member 1. The rotation of the hub member 1 is transmitted to the input shaft through a spline engagement.

As shown in FIG. 1 and FIG. 2, the torque absorbing device A includes the hub member 1 having the hub portion 11 and a flange portion 12, the disc plate 2, a sub plate 3 and three torsion members 5. The flange portion 12 extends radially outwardly from the outer circumferential portion of the hub portion 11. The disc plate 2 and the sub plate 3 are disposed around the hub portion 11 of the hub member 1 so as to be positioned on opposite sides of the flange portion 12 in the axial direction, and thereby sandwich the flange portion 12 of the hub member 1 therebetween. The three torsion members 5 elastically interconnect the hub member 1 and the plates 2, 3 in the circumferential direction of the device.

In this embodiment, each of the torsion members 5 is comprised of a first coil spring 51 having a relatively larger diameter and a second coil spring 52 whose diameter is smaller than that of the first coil spring 51. The smaller coil spring 52 is disposed in the first coil spring 51 so as to be parallel with the first coil spring 51. Of course, each of the torsion members 5 need not necessarily be comprised of two coil springs and it is possible to employ a torsion member consisting of a single coil spring. Furthermore, it is possible to use an elastic member such as rubber and the like as a torsion member.

Three windows 21, 31 are formed on the disc plate 2 and the sub plate 3 at regular intervals. These windows 21, 31 extend in the circumferential direction and are disposed on a concentric circle. Three notches 13 which extend in the circumferential direction and which are located on the same concentric circle are formed on the flange portion 12 of the hub member 1 at the same regular intervals. The notches 13 and the windows 21, 31 overlap one another in the circumferential direction with every two overlapping windows 21, 31 and every one overlapping notch 13 forming a group. Each of the torsion members 5 is disposed in one of the three groups of notches and windows under a condition in which the torsion member 5 is contracted by a predetermined amount. Seat members 53, 54 are disposed adjacent the axial end portions of the torsion members 5, the circumferential end portions of the notches 13 and the circumferential end portions of the windows 21, 31 so as to be pressed on the circumferential end portions of the notches 13 and the windows 21, 31 by the spring force of the torsion members 5.

Figure 3:
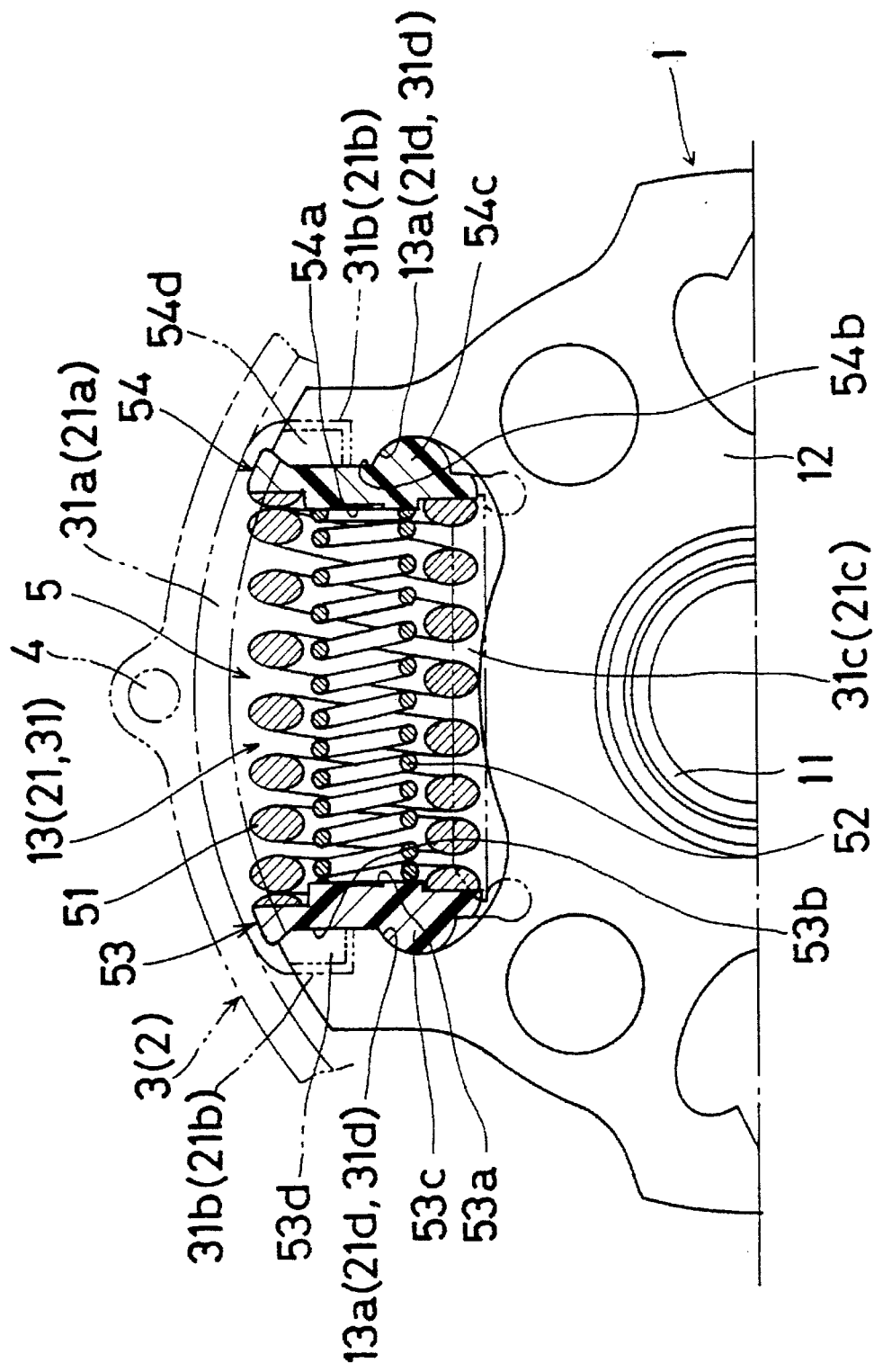
FIG. 3 is an enlarged plan view, partially in section, of a portion of the device shown in FIG. 1.
Figure 4:
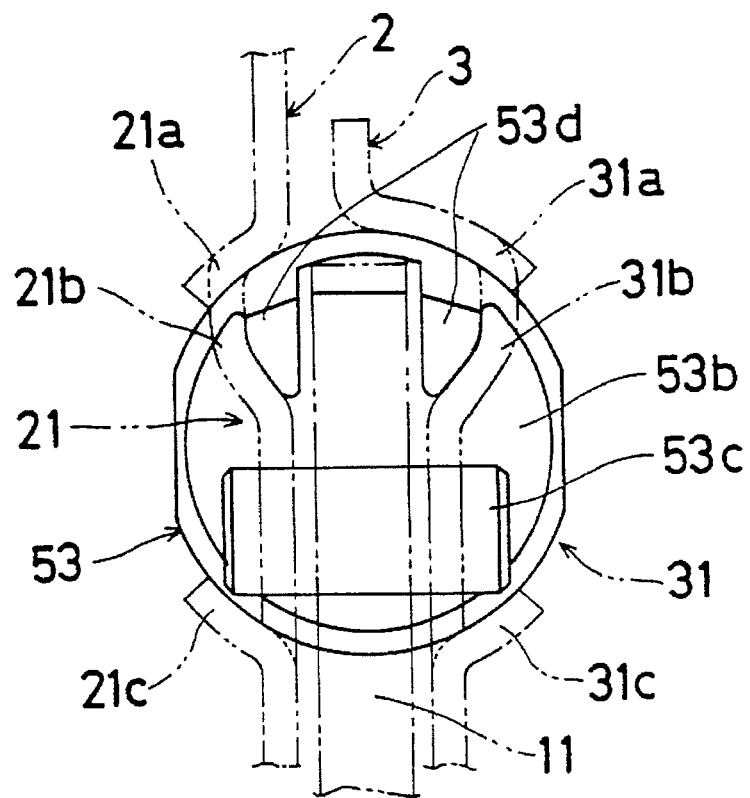
FIG. 4 is a cross-sectional view of the device shown in FIG. 3.
Figure 5:
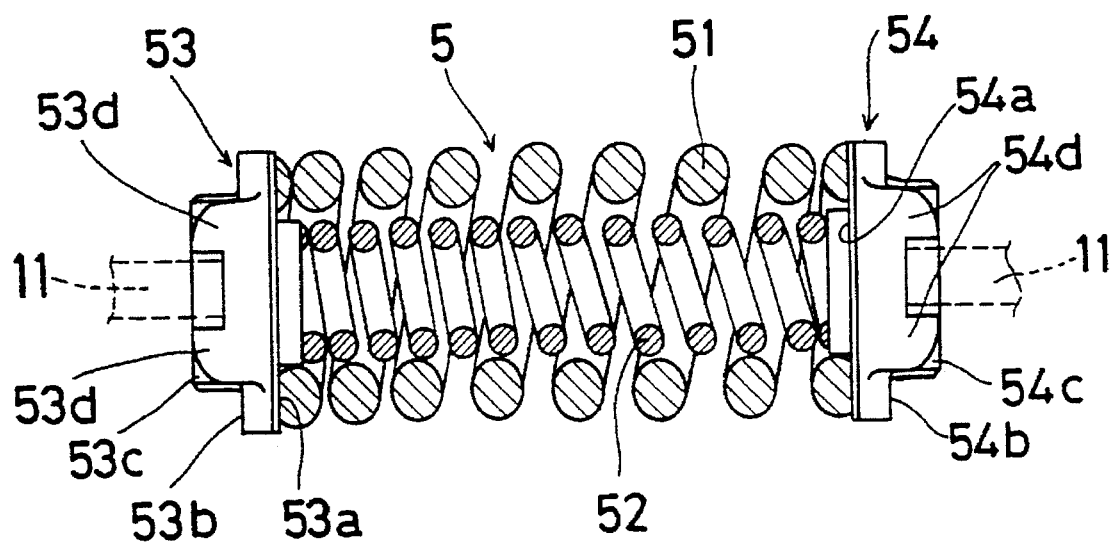
FIG. 5 is a side view of the device shown in FIG. 4.

As shown in FIG. 2, FIG. 3 and FIG. 4, the outer circumferential portions of the windows 21, 31 have a general arc shape (see FIG. 3) and are provided with first edge portions 21a, 31a, respectively (see FIGS. 2 and 4). The first edge portions 21a, 31a are formed by bending and have a flange shape that projects in the axial direction and extends in the circumferential direction to at least partially surround the radial outer portions of the torsion members 5 on opposite sides.

The inner circumferential portions of the window portions 21, 31 have a generally straight shape (see FIG. 3) and are provided with third edge portions 21c, 31c, respectively (see FIGS. 2 and 4). The third edge portions 21c, 31c are formed by bending and have a flange shape that projects in the axial direction and extends in the circumferential direction to surround the radial inner portions of the torsion members 5. the seat members 53, 54 and the torsion members 5 are prevented from jumping out of the window portions 21, 31 by these first and third edge portions 21a, 31a, 21c, 31c under the condition that the torsion members 5 are contracted.

As seen with reference to FIGS. 3 and FIG. 4, second edge portions 21b, 31b are formed on the portions of the disc plate 2 and the sub plate 3 respectively which are adjacent to the circumferential end portions of the outer circumferential portions of the window portions 21, 31. The second edge portions 21b, 31b are formed by drawing to project in the axial direction of the disc and to form a space between the flange portion 12 of the hub member 1 and the plates 2, 3. These spaces open into the window portions 21, 31. The second edge portions 21b, 31b are successive to the first edge portions 21a, 31a, whereby the strength of the first edge portions 21a, 31a against the load applied to the first edge portions 21a, 31a due to the contraction of the torsion members 5 and the centrifugal force applied to the torsion members 5 is improved.

As shown in FIG. 3 to FIG. 9, one side face (i.e., a first side face) 53a, 54a of the seat members 53, 54 which contacts the axial end portions of the torsion members 5 have outer flat surfaces as well as inner flat surfaces that project from the outer flat surfaces. The outer flat surfaces contact the axial end portions of the first coil springs 51 and the inner flat surfaces contact the axial end portions of the second coil springs 52.

The opposite side face (i.e., a second side face) 53b, 54b of the seat members 53, 54 contacts the circumferential end portions of the notches 13 of the flange portion 12 of the hub member 1 at the center portion in the axial direction of the disc. The side faces 53b, 54b of the seat members 53, 54 also contact the circumferential end portions of the windows 21, 31 of the plates 2, 3 at both outer portions in the axial direction of the disc.

Figure 6:
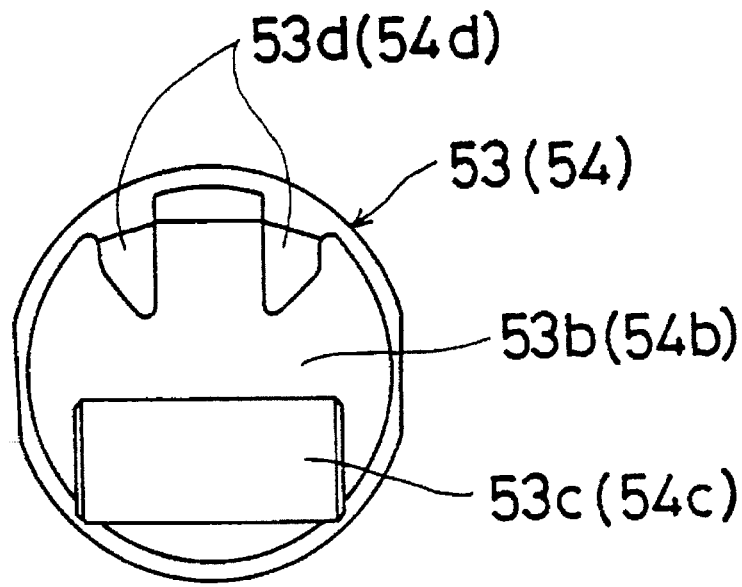
FIG. 6 is a plan view of the seat member utilized in the torque absorbing device of the present invention.
Figure 7:
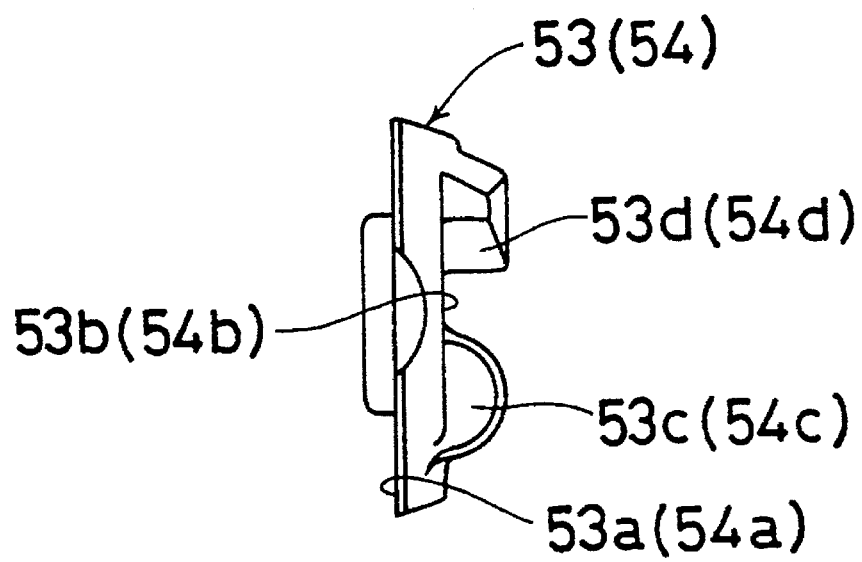
FIG. 7 is a side view of the seat member depicted in FIG. 6.
Figure 8:
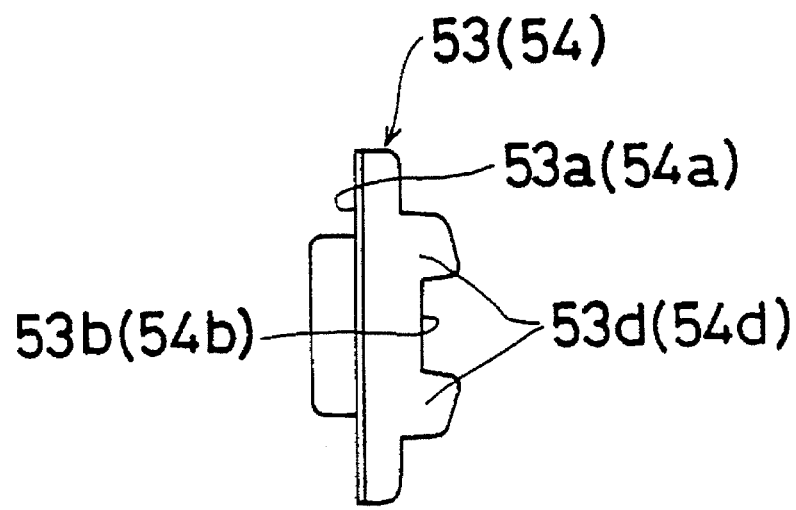
FIG. 8 is a top view of the seat member shown in FIG. 6.
Figure 9:
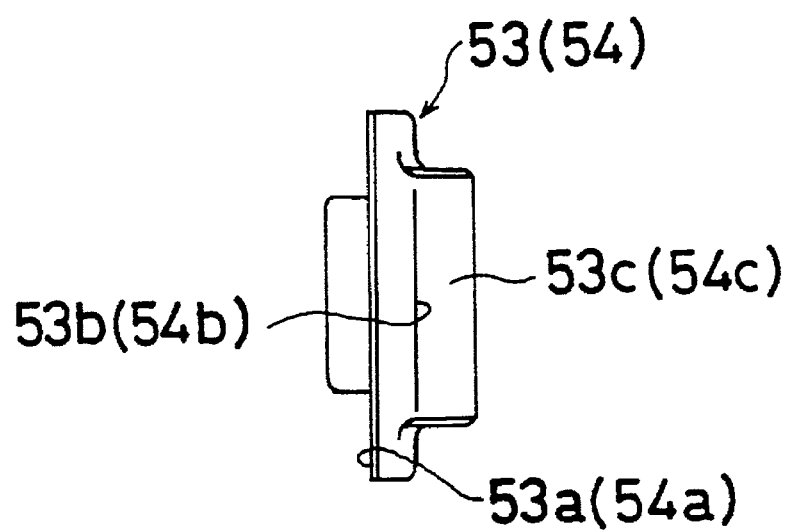
FIG. 9 is a bottom view of the seat member illustrated in FIG. 6.

On the radial inner portions of the second faces 53b, 54b, holding portions 53c, 54c are formed as seen in FIGS. 6, 7 and 9. These holding portions 53c, 54c have a semi-circular cross-sectional shape, project toward the circumferential end portions of the notches 13 and the windows 21, 31, and project in the axial direction of the disc. On the other hand, a pair of guide portions 53d, 54d which project toward the circumferential end portions of the notches 13 and the windows 21, 31 are formed on each of the radial outer portions of the second side faces 53b, 54b as seen in FIGS. 6–8. Each pair of guide portions 53d, 54d extends in parallel with the side face of the flange portion 12 in the diametrical direction.

On the radial inner portions of the circumferential end portions of the notches 13 of the flange portion 12 of the hub member 1 and the windows 21, 31 of the plates 2, 3, concave portions 13a, 21d, 31d are formed which have the same cross-sectional shape (i.e., half circle or semi-circle) as the holding portions 53c, 54c so as to be opposite to the holding portions 53c, 54c. The holding portions 53c, 54c are positioned in the concave portions 13a, 21d, 31d so that the seat members 53, 54 are held on the hub member 1, the disc plate 2, and the sub plate 3 in the circumferential and diametrical directions of the disc. In this embodiment, the cross-sectional shape of the holding portion 53c (54c) is a half circle or semi-circle, but it is possible to utilize a holding portion having other cross-sectional shapes so long as the concave portion 13a (21d, 31d) has the same cross-sectional shape as the holding portion to thereby hold the seat member 53 (54). Furthermore, the flange portion 12 of the hub member 1 is nipped held between each pair of guide portions 53d, 54d in the axial direction of the disc and each pair of guide portions 53d, 54d is disposed in the spaces formed by the second edge portions 21b, 31b. Thus, the seat members 53, 54 are supported by the hub member 1, the disc plate 2 and the sub plate 3 in the axial direction of the disc.

The above-described embodiment of the torque absorbing device operates as follows. When the clutch is connected, torque is transmitted to the disc plate 2 and the sub plate 3 through the facings 6A, 6B. The torque which is transmitted to the plates 2, 3 is further transmitted to the transmission through the torsion members 5 and the hub member 1. At this time, the hub member 1 and the plates 2, 3 are rotated relative to one another with a predetermined torsion characteristic while the torsion members 5 are contracted in response to the value of the applied torque. Thus, an absorbing affect with respect to the torque transmission is obtained. The torque absorbing device A is provided with a hysteresis mechanism comprising a first thrust plate 10a, a second thrust plate 10b and a dish spring 10c. The first thrust plate 10a is disposed around the hub portion 11 of the hub member 1 between the disc plate 2 and the flange portion 12 of the hub member 1. The second thrust plate 10b is disposed around the hub portion 11 of the hub member 1 between the sub plate 3 and the flange portion 12 of the hub member 1. Hence, the hysteresis characteristics are added to the torsion characteristics when the hub member 1 and the plates 2, 3 are rotated relative to one another. As a result, a damping affect with respect to torque transmission from the plates 2, 3 to the hub member 1 is obtained. By way of example, when each of the torsion members 5 is contracted by torque which is applied from left side in the circumferential direction in FIG. 3, the second side face 53b of each of the seat members 53 contacts the respective circumferential end portions of the plates 2, 3 which are located at the input side (left side in FIG. 3) and is separated from the respective circumferential end portions of the notches 13 of the flange portion 12 of the hub member 1 which is located at the input side (left side in FIG. 3). The second side face 54b of each of the seat members 54 contacts the circumferential end portions of the notch portions 13 of the flange portion 12 of the hub member 1 which is located at the output side (right side in FIG. 3) and is separated from each of the circumferential end portions of the plates 2, 3 located at the output side (right side in FIG. 3). At this time, each of the seat members 53 is prevented from moving relative to the plates 2, 3 in the circumferential, diametrical and axial directions of the device by the engagement between each of the holding portions 53c and each of the concave portions 21d, 31d, the engagement between each of the guide portions 53d and each of the second edge portions 21b, 31b, and each of the first edge portions 21a, 31a. Furthermore, each of the seat members 54 is prevented from moving relative to the hub member 1 in the circumferential, diametrical and axial directions of the device by the engagement between each of the holding portions 54c and each of the concave portions 13a and the fact that the flange portion 12 of the hub member 1 is nipped by each of the guide portions 54d.

The flange portion 12 of the hub member 1 is provided with three holes 12a which are formed between the adjacent notches 13. Thus, the stress which is applied from each of the holding portions 53c to the flange portion 12 is efficiently dispersed. As a result, the strength of the flange portion 12 of the hub member 1 is maintained and therefore it is possible to reduce the thickness of the flange portion 12.

As mentioned above, when the torsion members 5 are contracted, the seat members (in the above description, the seat members 54) which are movable relative to the disc plate 2 and the sub plate 3 are prevented from moving by the hub member 1. Hence, these seat members are not pressed on the disc plate 2 and the sub plate 3 and therefore are prevented from wearing. Furthermore, since the seat members 53, 54 are prevented from moving relative to the hub member 1 by the holding portions 53c, 54c and the guide portions 53d, 54d, it is possible to dispose the torsion members 5, including the seat members 53, 54, in the notch portions 13, each of whose outer circumferential portions is opened. As a result, it is not necessary to form window portions on the flange portion 12 of the hub member 1 and so the weight of the hub member 1 is decreased.

Figure 10:
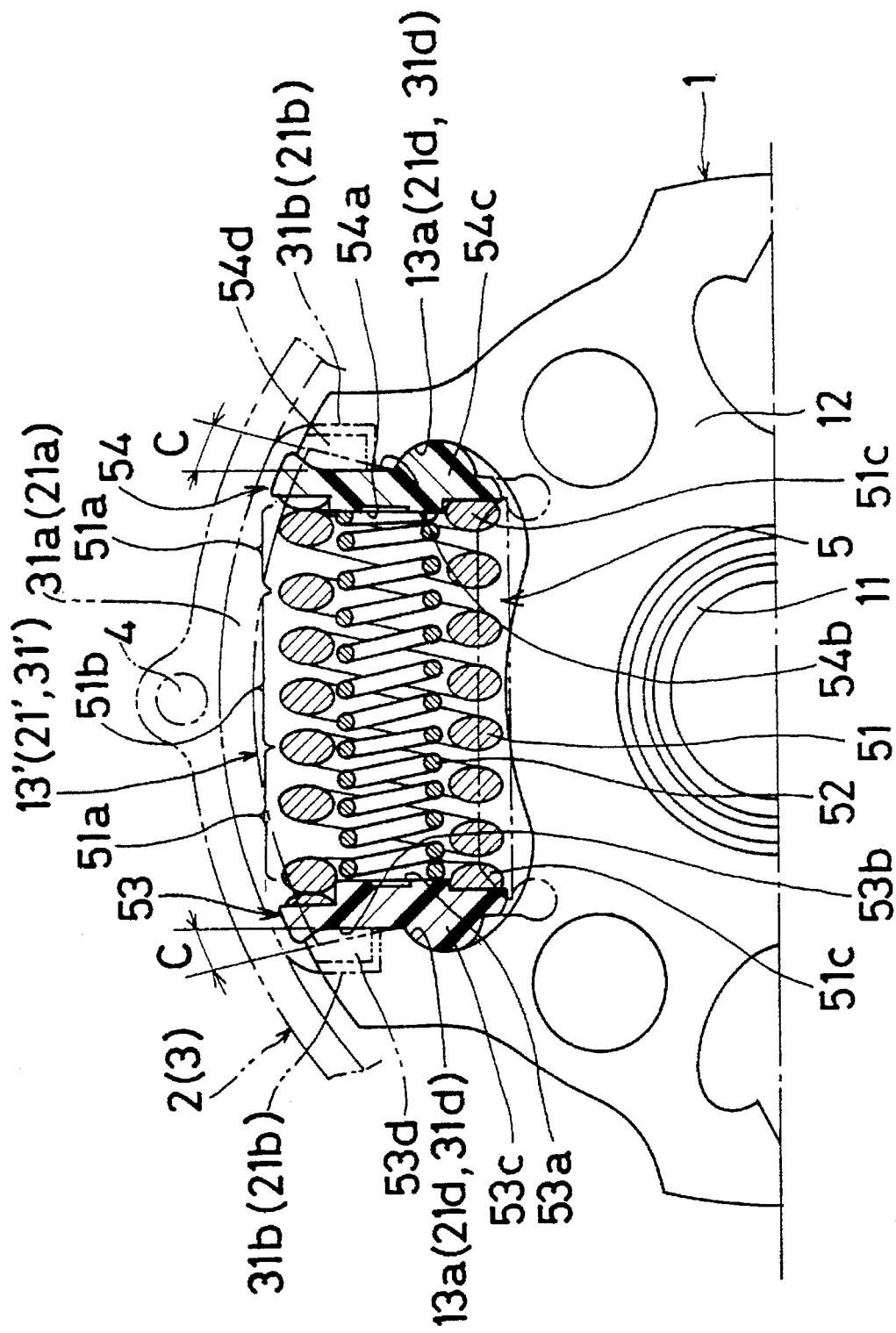
FIG. 10 is a plan view, partially in section, illustrating a second embodiment of a clutch disc to which is applied a torque absorbing device in accordance with the present invention.

FIG. 10 shows a partly expanded sectional view of a second embodiment of the present invention. In FIG. 10, the same parts as compared with FIG. 3 are identified by the same reference numerals as those utilized in FIG. 3. In this second embodiment, the windows 21', 31' and the notches 13' have a fan shape. Both circumferential end surfaces of each of the windows 21', 31' and the notches 13' have an inclination of a predetermined angle C with respect to the flat surfaces of the second side faces 53b, 54b of the seat members 53, 54 so as to form a space therebetween. Thus, the seat members 53, 54 are rotatable around the holding portions 53c, 54c in the circumferential direction with regard to the flange portions 12 of the hub member 1, the disc plate 2 and the sub plate 3. In the situation where the seat members 53, 54 are rotated, the seat members 53, 54 are supported by the holding portions 53c, 54c and the concave portions 13a, 21d, 31d in the diametrical direction of the disc and are supported by the guide portions 53d, 54d in the axial direction of the disc.

As shown in FIG. 10, the first coil spring 51 is provided with first wound portions 51a and a second wound portion 51b. The first wound portions 51a extend a certain distance toward the center portion from both axial end portions on which a seat portion 51c is formed. Both first wound portions 51a have the same number of windings and the same pitch. The second wound portion 51b is located between both first wound portions 51a and has a pitch smaller than that of the first wound portions 51a. In this embodiment, the second coil spring 52 has an equal or constant pitch throughout, but it is possible to change the pitch of the second coil spring 52 in the same manner as the first coil spring 51. As mentioned above, since the first coil spring 51 having different pitches is symmetrical in the axial direction, even if the first coil spring 51 is installed on the hub member 1, the disc plate 2 and the sub plate 3 in either axial direction, the unbalance of the weight does not occur. Thus, it is possible to easily install the torsion member 5 on the hub member 1, the disc plate 2 and the sub plate 3 so that excessive man-hour time in assembling is prevented. Also, erroneous assembling is avoided. In this embodiment, the other structures are the same as the above mentioned first embodiment.

Figure 11:
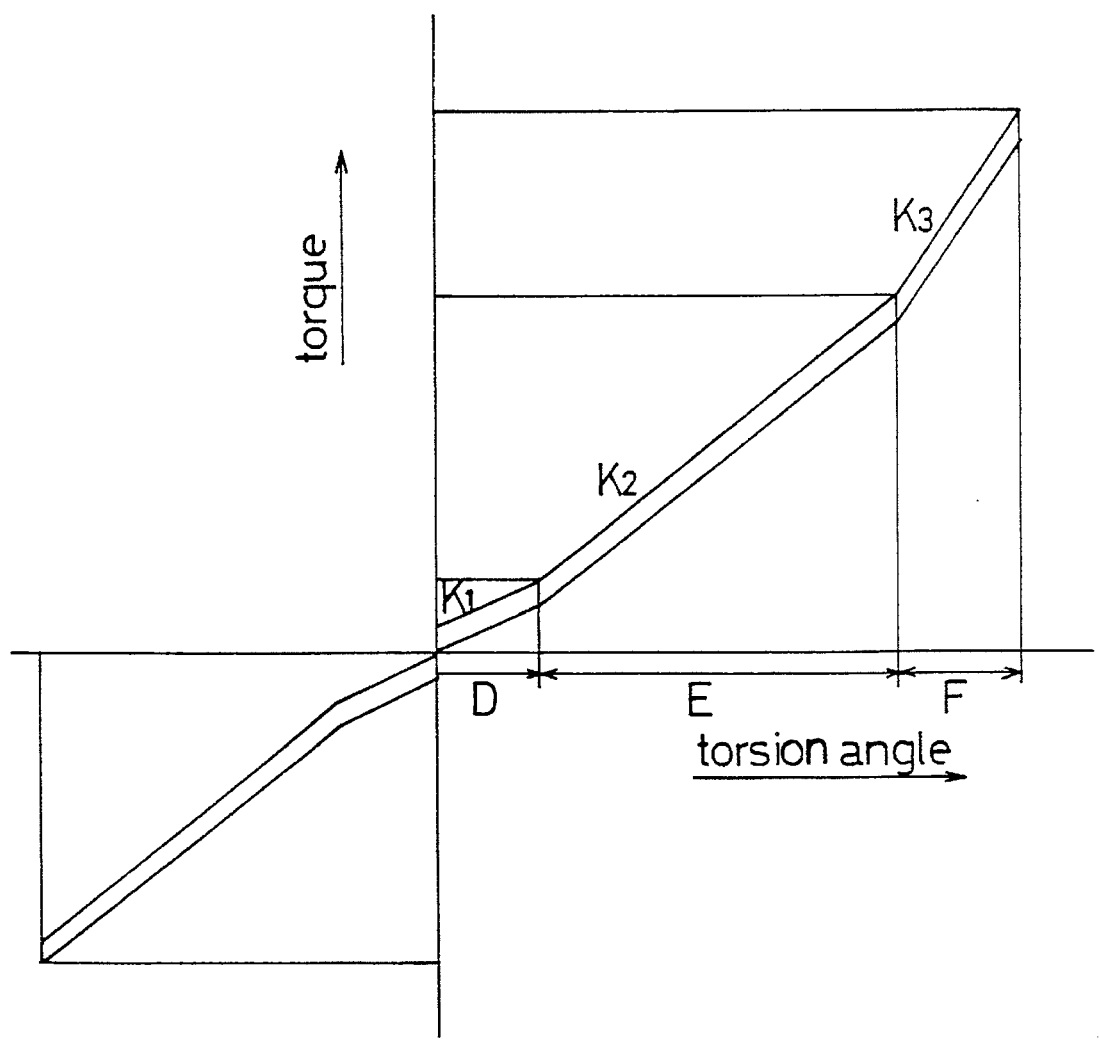
FIG. 11 is a graph showing the torsion characteristics associated with the torque absorbing device depicted in FIG. 10.

When the clutch is connected, torque is transmitted from the disc plate 2 and the sub plate 3 to the hub member 1, through the torsion members 5. At this time, the hub member 1 and the plates 2, 3 are rotated relative to one another with the torsion characteristics shown in FIG. 11 while the torsion members 5 are contracted in response to the degree or amount of applied torque. As shown in FIG. 11, the torsion members 5 are contracted in response to the torque. In the area D of the torsional angle shown in FIG. 11, the torsion members 5 are contracted more or less and thereby the seat members 53, 54 are rotated with the predetermined angle C to contact circumferential end surfaces of each of the windows 21', 31', and the notches 13' have an inclination of a predetermined angle C with respect to the flat surfaces of the second side faces 53b, 54b of the seat members 53, 54. As a result, the torsion characteristic K1 is obtained and the torque transmission of the torque value based on the torsion characteristic K1 is realized. In the area E of the torsion angle shown in FIG. 11, the first wound portion 51a and the second wound portion 51b of each of the first coil springs 51 and each of the second coil springs 52 are contracted. Consequently, the torsion characteristic K2 is obtained and the torque transmission of the torque value based on the torsion characteristic K2 is realized. Furthermore, in the area F of the torsion angle shown in FIG. 11, the first wound portion 51a of each of the first coil springs 51 is completely contracted and the second wound portion 51b of each of the first coil springs 51 and each of the second coil springs 52 are contracted. Thereby, the torsion characteristic K3 is obtained and the torque transmission of the torque value based on the torsion characteristic K3 is realized.

As mentioned above, in this second embodiment, when the torsion members 5 are contracted, the seat members 53, 54 are rotated relative to the disc plate 2, the sub plate 3 and the flange portion 12 of the hub member 1 in the circumferential direction of the disc. Thus, the torsion characteristic K1 due to the rotation of the seat members 53, 54 is obtained before the torsion characteristics K2, K3 due to the contraction of the torsion members 5. Accordingly, multistage torsion characteristics are obtained without various torsion members 5 and so it is possible to reduce the number of parts and simplify the structures.

As also mentioned above, according to the present invention, the seat members which are movable relative to the plate members are prevented from moving relative to the hub member in the diametrical and the axial directions of the disc by the engagement between the holding portions and the flange portion of the hub member and the engagement between the guide portions and the flange portion of the hub member. Therefore, when the torsion members are contracted, the seat members are not pressed on the plate members and so it is possible to prevent the seat members from wearing. Furthermore, since it is possible to form a space for receiving a torsion member on the flange portion of the hub member by a notch portion, it is possible to decrease the weight of the hub member.

The principles, preferred embodiments and modes of operation of the present invention have been described in the foregoing description. The invention which is intended to be protected herein should not, however, be construed as limited to the particular forms disclosed, as these are to be regarded as illustrative rather than restrictive. Variations and changes may be made, and equivalents employed, by those skilled in the art without departing from the spirit of the present invention. Accordingly, it is expressly intended that all such variations, changes and equivalents which fall within the spirit and scope of the present invention as defined in the claims be embraced thereby.

What is claimed is:

1. A torque absorbing device comprising:

a hub member having a flange portion and a hub portion;

plate members disposed around the hub portion of the hub member and positioned opposite to the flange portion in the axial direction, a plurality of torsion members elastically interconnecting the hub member and the plate members in the circumferential direction; and a plurality of seat members each of which is disposed among each of the torsion members, the plate members and the hub member, each of the seat members having a first side face contacting an end surface of one of the torsion members and an opposite second side face contacting the plate members and the flange portion of the hub member, the second side face of each seat member being provided with a projecting holding portion which is held on the flange portion of the hub member so as to be immovable relative to the hub member and a guide portion which nips the flange portion of the hub member in an axial direction.

2. A torque absorbing device as recited in claim 1, wherein the plate members comprise two plates, each of the plates being provided with a plurality of windows extending in the circumferential direction at regular intervals and located on a concentric circle, the flange portion of the hub member being provided with a plurality of notches extending in the circumferential direction at regular intervals that correspond to the regular intervals at which the windows extend so that a window in each plate and a notch in the flange portion overlap one another in the axial direction, the notches being located on said concentric circle, the torsion members being disposed in the windows and notches which overlap each other.

3. A torque absorbing disc as recited in claim 2, wherein the holding portions project in a circumferential direction, and including concave portions formed on a side face of the plate members and the flange portion of the hub member which receive the holding portions.

4. A torque absorbing disc as recited in claim 3, including axially projecting edge portions formed at outer circumferential end portions of the windows to form a pair of spaces between the flange portion of the hub member and the plate members, the guide portions being positioned in the spaces to nip the flange portion of the hub member therebetween.

5. A torque absorbing disc as recited in claim 4, wherein the holding portions of the seat members have a semicircular cross-sectional shape, and the concave portions of the plate members and the flange portion of the hub member have the same shape as the holding portions.

6. A torque absorbing disc as recited in claim 5, including means for allowing the seat members to rotate around the holding portions in the circumferential direction.

7. A torque absorbing disc as recited in claim 6, wherein the seat members having a flat surface at the second side face, the holding portions being formed on inner circumferential end portions of the second side face portions of the seat members, the concave portions being formed on inner circumferential end portions of the windows and the notches, said means for allowing the seat members to rotate around the holding portions including each of the outer circumferential end surfaces of the windows and the notches having an inclination of a predetermined angle with respect to opposing flat surfaces of the second side faces of the seat members.

8. A torque absorbing device according to claim 1, wherein each torsion member includes a pair of springs, one of which surrounds the other.

9. A torque absorbing device according to claim 8, wherein one of said springs includes an axially central portion and two outer portions, the outer portions of the one spring having windings that are of a pitch different from the windings of the central portion.

10. A torque absorbing device comprising:

a hub member having a radially extending flange portion and a hub portion;

plate members disposed around the hub portion on opposite sides of the flange portion;

a plurality of torsion members elastically interconnecting the hub member and the plate members in the circumferential direction to absorb torque created during relative rotational movement between the hub member and the plate members; and a seat member positioned at each end of each respective torsion member, each seat member having a first side face contacting the end of the respective torsion member and an oppositely facing second side face, the second side face of each seat member having a projecting holding portion which is received in recesses provided in the flange portion and the plate members to hold the seat member on the hub member and the plate members in circumferential and diametrical directions.

11. A torque absorbing device as recited in claim 10, wherein each plate member is provided with a plurality of windows and the flange portion is provided with a notch, each notch being axially aligned with a window in each plate member, each torsion member being positioned in one of the notches and the aligned windows, the recesses in the plate members being positioned at circumferential end portions of the windows, the recesses in the flange portion being positioned at circumferential end portions at the notches.

12. A torque absorbing device according to claim 10, wherein each torsion member is positioned in a window provided in each of the plate members, the plate members each having first edge portions disposed along a radially outwardly located portion of the windows, said first edge portions at least partially surrounding radial outer portions of the torsion members.

13. A torque absorbing device according to claim 12, wherein each plate member has second edge portions disposed along a radially inwardly located portion of the windows, said second edge portions at least partially surrounding radial inner portions of the torsion member.

14. A torque absorbing device comprising:

a hub member having a radially extending flange portion and a hub portion;

plate members disposed around the hub portion on opposite sides of the flange portion;

a plurality of torsion members elastically interconnecting the hub member and the plate members in a circumferential direction to absorb torque created during relative rotational movement between the plate members and the hub member; and a seat member positioned at each end of each respective torsion member, each seat member having a first side face contacting the end of the respective torsion member and an oppositely facing second side face, the second side face of each seat member having a pair of projecting guide portions between which is pinched the flange portion of the hub member.

15. The torque absorbing device as recited in claim 14, wherein each torsion member is positioned in a window provided in each of the plate members, the plate members each having first edge portions disposed along a radially outwardly located portion of the windows, said first edge portions at least partially surrounding radial outer portions of the torsion members.

16. The torque absorbing device as recited in claim 15, wherein each plate member has second edge portions disposed along a radially inwardly located portion of the windows, said second edge portions at least partially surrounding radial inner portions of the torsion member.

17. The torque absorbing device as recited in claim 14, including a holding portion projecting from the second side face of each seat member, each holding portion being received in recesses formed in the flange portion and the plate member.

* * * * *